United States Patent
Zuesse

(10) Patent No.: US 6,807,560 B1
(45) Date of Patent: Oct. 19, 2004

(54) METHOD FOR ENCOURAGING INTERNET PUBLICATION BROWSING WHILE DISCOURAGING UNAUTHORIZED PRINTING

(76) Inventor: Lance E. Zuesse, 23 N. Main St., P.O. Box 66, Whiting, VT (US) 05778

(*) Notice: Subject to any disclaimer, the term of this patent is extended or adjusted under 35 U.S.C. 154(b) by 771 days.

(21) Appl. No.: 09/684,272

(22) Filed: Oct. 6, 2000

(51) Int. Cl.[7] .............................. G06F 15/16; H04L 9/00
(52) U.S. Cl. ....................................... 709/203; 713/165
(58) Field of Search ........................ 709/203; 707/100; 713/201, 165, 522

(56) References Cited

U.S. PATENT DOCUMENTS 6,012,071 A * 1/2000 Krishna et al. ............. 715/522
6,298,446 B1 * 10/2001 Schreiber et al. ........... 713/201
6,301,660 B1 * 10/2001 Benson ........................ 713/165
6,654,754 B1 * 11/2003 Knauft et al. ............... 707/100

* cited by examiner

Primary Examiner—John Follansbee
Assistant Examiner—Philip Lee
(74) Attorney, Agent, or Firm—Kevin Ellicott, Esq.

(57) ABSTRACT

A method for making written material available for browsing and downloading via the global computer network while discouraging unauthorized printing of that written material, wherein the method includes uploading to and making available from a server a salable file embodying the written material and uploading to and making available for browsing on the server a browsable file containing the written material, the written material having a colored background and contrasting text such that printing of the written material embodied in the browsable file consumes sufficient quantities of printer medium so as to discourage unauthorized printing of the written material.

3 Claims, No Drawings

METHOD FOR ENCOURAGING INTERNET PUBLICATION BROWSING WHILE DISCOURAGING UNAUTHORIZED PRINTING

CROSS REFERENCE TO OTHER APPLICATIONS

This is the first submission of an application for this novel internet business method. There are no other applications, provisional or non provisional.

FEDERALLY SPONSORED RESEARCH AND DEVELOPMENT

There are no federally sponsored or funded research or development projects or undertakings in any way associated with the instant invention.

BACKGROUND OF THE INVENTION

1. Field of the Invention

The instant invention relates to that field of invention consisting of internet publication of books, magazines and periodicals. Specifically, the instant invention is an internet business method for encouraging the browsing of written materials viewable on the internet while at the same time discouraging the unauthorized printing of those written materials.

2. Background Information

This invention relates to the industry commonly known as "internet publishing" or "e-publishing". As is well known, data storage and processing machines (computers) are currently able to communicate with one another, over a distance, via connections commonly referred to as the "internet". Though somewhat confusing, the term "internet" is frequently applied to describe both the physical structure over which the data is carried, as well as a general term applied to the sum total of the data available to computers so connected. While it is unknown precisely how many such computers communicate with one another in such a fashion on a daily basis, it is well known that the number is quite large, and expected to continue growing.

A development which has occurred due to the ability of computers to communicate (or share information and data) in this fashion is the establishment of roles for the respective computers providing the data (so-called "servers") and those requesting the data (so-called "clients"). At present, not only have these clients and servers been constructed to share information between one another, but they have spawned what is now referred to as "e-commerce".

E-commerce may be best understood in general terms as the buying and selling of goods and services remotely, from computer user to computer user, via the internet. E-commerce involves many of the same processes which are utilized when entering into traditional purchase and sales transactions. However, rather than viewing the goods at a traditional business outlet such as a store (so-called "brick and mortar" retailers), the potential purchaser searches the internet utilizing a so-called "search engine" and/or "browser" and locates so-called "web pages" (individual data collections which function as parts of the whole, the whole often being referred to as either the "world wide web" or internet) and views the goods and/or descriptions in order to determine whether or not to purchase same.

A frequent scenario in e-commerce is for a client to request information/data from a server, for example, a catalog. The requester of the data may then view the catalog at his or her computer. Sometimes a connection is maintained between the server which provides the data, and the client requesting the data. In other cases, the catalog is simply transferred, in the form of data, directly to the client. Furthermore, the catalog (data) may incorporate certain "fields", "pull down menus", "radio buttons", "links" or other similar data entry/data selection areas for purposes of communicating to the server a request by the client to initiate a purchase. The server then processes this request, secures information regarding payment (again, utilizing some form of data entry area) and completes the transaction.

Unlike the more traditional forms of commerce where one may visit a brick and mortar retailer's store and view, closely inspect, and even hold the goods, e-commerce has faced the serious limitation of being unable to provide anything more than a picture, whether still or moving, and perhaps a sound recording.

These particular limitations have been felt perhaps most seriously among the purveyors of written materials; the internet publishers and retailers of printed matter. Internet publishing and online sales of written material is a niche within e-commerce in which it is well recognized that book buyers, in particular, are at an acute loss when they are unable to hold a book and thumb through the pages (commonly referred to as "book browsing") prior to making a purchase decision.

So deep seated is this need to inspect the contents of a book prior to purchase that some major "brick and mortar" retailers have gone to the trouble and expense of making comfortable seating (plush chairs and couches) and refreshments available to customers precisely to encourage book browsing on the premises.

Worse still has been the plight of the internet publishers, especially those who "publish on demand" (POD). In essence, the internet publication on demand industry generally does not produce actual physical books. Instead, it provides servers from which books may be downloaded (copied) into clients. Unlike the traditional brick and mortar book seller who provides actual physical access to the book, or the online book seller who provides a catalog of book titles and perhaps a small picture of the cover of the book, the POD industry on the internet typically has little or nothing to show a prospective purchaser. At best, a picture of the cover or even an excerpt from the book may be offered. This limitation is a serious detriment to the POD publisher. But it may be even more daunting a problem to the new or up and coming author who has little chance of securing publication through the larger publishing industry (or "publishing houses"). For the new author, POD holds the promise of reaching millions of computer users with the most minimal capital outlay on the author's or publisher's part. But in order to fulfill that promise, POD publishers will first have to find a way to compete with the ability of brick and mortar bookstores to offer book browsing prior to making a book purchase.

Efforts to date to provide the sort of "book browsing experience" available at traditional brick and mortar outlets have yielded no positive results. Online book sellers, and especially POD publishers have utilized a variety of computer programs to make written materials available for viewing online. Unfortunately, each computer program has a serious limitation. If the material is placed on the internet to browse (analogous to "book browsing"), it is just as easily copied without any payment being made by the copyist to the publisher, merchant, or copyright owner. Examples of prior art methods for making written materials available for viewing online include scanning the written material into a photograph format (so-called .gif, .jpg and .art, to name a few) and embedding the photographic copy of the material on a web page (utilizing web page generation language such as so-called HTML code and JAVA script, to name a few) as well as scanning or rewriting the printed material into other popular formats such as .pdf, produced by ADOBE, in a program known as ACROBAT. Irrespective of the format in which the written material is made available online, unauthorized copying of the entire work (thus depriving the owner/licensee of due payment) has been unavoidable in the prior art if the written material is made available for browsing.

In short, e-commerce in the POD/Online book seller industry has been both stunted and handicapped due to a serious inherent limitation in the arts. The stumbling block to date may be most easily described as the apparently unsolvable problem of how to provide access to the contents of a publication over the internet (make the written material browsable), while at the same time being able to discourage, if not completely prevent, the unauthorized copying and/or printing of that material. The POD/Online book seller industry since its inception has wrestled with this problem, and until the advent of the instant invention, had no means for overcoming it.

SUMMARY OF THE INVENTION

The instant invention is a method for permitting the browsing of written material made available over the internet while discouraging the unauthorized printing of the written material being browsed, yet permitting authorized printing of same.

A first object of the instant invention is to provide those who advertise and sell written material over the internet with a method which will permit potential buyers of that printed material to browse the work embodied in the written material prior to their purchase, yet so seriously discourage the printing of that material prior to purchase that the typical potential purchaser instead will make the purchase rather than attempt to copy and print the material.

This first object is accomplished by a method which permits viewing of the written material, but causes the printing of that material to consume so much printer ink, toner, etc., so as to make printing the complete work embodied in the written material more costly and inconvenient than purchasing the written material from the seller, thus discouraging unauthorized printing of the written material.

A second object of the instant invention is to provide those who advertise and sell written material over the internet with a method which will permit potential buyers of that printed material to browse the work embodied in the written material prior to their purchase, yet render unauthorized printing of that material so difficult and/or costly as to dissuade the large majority of viewers from printing the material without paying for it.

This second object is accomplished by a method which permits viewing of the written material, but, upon attempting to print the material, having that written material include a code which instructs the printing device of the copyist to print the written material using a darkened or colored background, the darkened or colored background causing the printing of that material to consume so much printer ink, toner, etc. so as to make printing the complete work embodied in the written material more costly and inconvenient than purchasing the written material from the seller.

A third object of the instant invention is to provide those who advertise and sell written material over the internet with a method which will permit potential buyers of that printed material to browse the work embodied in the written material prior to its purchase, yet render unauthorized printing of that material impossible.

This third object is accomplished by a method which permits viewing of the written material but, upon attempting to print the material, either not offering a print option at all, or else having that written material include code which instructs the printing device of the copyist to refuse the print order. Yet, an authorized print request of the printed material will be complied with, and the material will print out.

A DESCRIPTION OF THE PREFERRED EMBODIMENT

The instant invention is directed to a method of and system for making available written materials online so that they may be browsed prior to purchase, while at the same time seriously discouraging, if not completely preventing, the unauthorized printing (that is, rendering a so-called "hard copy") of that written material.

In the typical use of the instant invention, POD publishers and/or sellers of written material place on their servers (so-called "uploading") copies of written materials which have been rendered in a machine readable format (so-called "files"). As noted above, those formats may include, though certainly not be limited to, those which are machine readable using programs such as Adobe Acrobat (utilizing PDF format), as well as various browser readable formats such as HTML and JAVA script, and so-called "picture viewer" programs capable of rendering visible on a CRT (or computer monitor) files saved in picture formats including but not limited to JPG, GIF and ART.

When practicing the instant invention, two files having identical written material are uploaded to the server. The differences between the two files will later be described in detail.

Following uploading of the files embodying the written materials onto the server, those materials are made available to the buying public. This is easily accomplished by creating a website or online presence from which the files may be accessed. The buying public may read a description of the written materials, and then choose to either "book browse" the materials online or immediately purchase the materials. Purchase is most often accomplished by utilizing the client to supply the needed payment information to the server and then having the written material transferred from the server to the client (so-called "downloading") in a format which may then be printed utilizing a printing device connected to the client. Most often this is accomplished with a printing device known as a printer.

In the first embodiment of the instant invention, a file having the written material which may be purchased is constructed such that it includes a background of a color other than white, and has text which is colored in a color sufficiently contrasting with the background color such that it is legible when viewed online and may be read by potential purchasers. This file may be referred to as the readable file or browsable file. The browsable file is uploaded to the server and made available to clients for viewing over the internet.

Next, a file having the same written material found in the browsable file is uploaded to the server. Naturally, when the term "same written material" is used, it will be understood that a mere change of punctuation, type font, or deminimus changes in wording would still constitue "the same written material". Perhaps the most simple way to explain "same written material" is to state that if the written material would violate constitute copyright infringement, it is the same written material. In the preferred embodiment, the written material contained within this file will consist of a white background and have text which is preferably black in color. This file may be referred to as the salable file. The salable file may be an easily printable file containing no impediments to its printing. The term "salable" file is preferred when describing the file which is not the browsable file as it more accurately conveys a portion of the process disclosed by instant invention. While the salable file may be printed upon downloading or copying (thus, being potentially a "printable file"), it is believed that a major breakthrough presented by the instant invention is the enablement of making written materials available for browsing and sale over a global computer network (thus, being salable) whether that written material is ultimately printed or merely read.

Both the browsable file and the salable file having been made available to potential clients, the purveyor of the materials embodied in the file (or whatever group or person is responsible for making the materials available to the public) provides means for accessing the browsable file and the salable file. This is most easily accomplished by having located on the website a browsable file link and a salable file link. Those familiar with the art will immediately understand that a link is a machine readable instruction which directs the server to provide the client with access to the file designated by the link.

In the event that the client instructs the server to provide access to the browsable file, the server provides access to the browsable file so that it may be viewed on the client. The potential buyer may then move throughout the browsable file (browse), in effect simulating the experience of browsing a book at a traditional bricks and mortar store.

It is entirely possible that the potential purchaser may successfully copy the browsable file from the server and onto the client. However, such a copied browsable file will contain the written material having a colored background and contrasting colored text.

Those familiar with printing written materials using conventional computer printers will immediately recognize the manner in which unauthorized copying is discouraged by the instant invention. First, in the event that the client is utilizing a black and white printer (that is, a printer incapable of printing colors other than black, white and shades of gray), the written material embodied in the copied browsable file will be printed only in black, white and shades of gray. Such a black and white printer (especially those of the so-called "ink jet" or "laser jet" types) will interpret the colored background as printable, but only in gray or black. This will cause the printer to use its ink, toner or whatever printing medium it uses for printing purposes, in such a way as to render the entire background of the written material in black or a shade of gray. Those familiar with computer printers will further recognize that printing the entire background, of the entire written material, will very quickly deplete the printer of its printing medium. Given that books, magazines and other periodicals can often contain tens or even hundreds of pages, such wholesale use of printer medium has the effect of rendering the written material excessively expensive to print. Furthermore, printing is almost invariably slower when a background is being printed in a color other than white, thus rendering unauthorized printing an arduous task. Clearly, most potential buyers will find such burdensome and/or expensive printing to be discouraging enough so as to make purchase of the written materials preferable to unauthorized copying.

Second, in the event that a printer capable of printing colored backgrounds and/or text is utilized by the copyist, the colored printer medium will be consumed in the same manner as that set out above for black and white printers. Again, as with black and white printers, excessive use of printer medium is both costly and time consuming.

By way of example, and without in any way suggesting any limitation in the instant invention, the above method may be easily practiced when the written material is to be presented in the HTML (Hyper Text Markup Language) format. In that case, one merely inserts at the beginning of the written materials the codes necessary to produce a webpage having a colored background and contrasting colored text when the browsable file is viewed by a browser located on the client. For example, if one wished the background of the written materials to appear in a somewhat lime green color, one would specify in the header of the HTML formatted document that 'BGCOLOR="#00FF00"'. Furthermore, if one wanted text of the written materials to appear as black against the lime green background, one would specify 'BODY TEXT="#000000"'. Those familiar with webpage creation and publication on the internet will immediately recognize that the codes set forth above represent simply one form of HTML code which will force a browser to display certain color combinations. Various conventions exist and various codes exist currently which will produce colored backgrounds and colored text when viewed by a browser. No attempt is made herein to set forth all of the possible codes and the above code is provided merely for understanding's sake. It should be further understood that rather than specifying a particular color utilizing conventional HTML codes, one may just as easily specify a background file which would function as the written material background. For example, one may create a picture format file (such as .gif) which, when viewed using an appropriate viewer, is merely a bright pink color filling the viewable area of the monitor. This bright pink color appearing on the monitor may be plain, or could even include other picture elements, such as a trademark logo. One would then include HTML code language in the header attached to the written material which would direct the client browser to open the background file and use said file as the background for the written material. Again, by way of non-limiting example, one could upload a background file named "pink.gif", and specify that this file be used as the background by the browser. Such specification could easily take the form of "BACKGROUND="pink.gif" (where the background file is located in the same directory as the browsable file).

In another example of the first embodiment, the browsable file is first generated utilizing a word processor program. When the word processor program generated document is being created, one specifies that the background of the written material will appear, for example, as black. One then specifies that the text appears in a color sufficiently contrasting against the black background so as to be legible. In this example, the text could be white.

Having created the file containing word processor generated written material, one would then convert said file into another machine readable format such as Acrobat. Conversion of this sort may easily be accomplished utilizing a translation program such as Acrobat Distiller or other similar distiller/translator/converter. In this example, the final browsable file would be formatted in the .pdf format and could be read online using a .pdf viewer such as Acrobat.

It should be remembered that many different programs and program file types may be used when making the browsable file available to the client. So long as the browsable file is formatted such that the written material is rendered with a colored background if the file is printed online or downloaded (copied) by the client and printed, the instant invention will function properly.

Thus, while the present invention has been fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in code language, programs utilized for file creation and/or file viewing.

In short, in order to practice the first embodiment of the instant invention, one need only upload and make available by the server a browsable file which is costly to print, and a salable file which may be copied and/or printed in a hard copy having no impediments to printing.

Hence, the proper scope of the present invention should be determined only by the broadest interpretation of the appended claims so as encompass all such modifications as well as all relationships equivalent to those described in the specification.

It will be appreciated that the purpose of the foregoing presentation of the first embodiment is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the specification and abstract is neither intended to define the invention or the application, which only is measured by the claims, nor is it intended to be limiting as to the scope of the invention in any way.

Finally, it should be readily apparent to those familiar with the art that the browsable file could include links which serve a variety of functions. By way of non-limiting example, it is entirely possible to include a link which would function to direct the client to the area of the server which would complete the purchase of the written material being viewed, and lead to the downloading of the salable file. Another possible link could add a function which would make a bibliography of the browsable file available. Still another possible link could open other files which include suggested reading lists, lists of other writings of the author and so on.

The remaining operation of the first embodiment of the instant invention may now be easily understood. A client connects to a server for purposes of viewing written materials with an eye toward potential purchase. Upon arriving at the internet location wherein the written material is made available for viewing (the website), the individual using the client is presented with the opportunity to "book browse" any number of browsable files. The individual, through the client, instructs the server to provide access to a particular browsable file which is then opened and becomes browsable by the client. The individual may read as much of the browsable file as he or she so chooses, but as has been described above, is discouraged from printing the browsable file.

The individual, having made a purchase decision, may now communicate to the server a proper request to purchase the written material. That proper request will include the transfer of data to the server, the data identifying the salable file containing the written material and providing compensation (or promise to compensate) by the individual for the requested written material. Following a proper request, the written material is transferred from the server to the client via a download of, or opportunity to copy, the salable file containing the written material from the server to or by the client.

In the second embodiment of the instant invention, it is unnecessary to include a colored background which would be visible in the browsable file. Instead, the browsable file would include in the formatting of the written material a command which causes any printing of the file to exhibit a non-white background. Those familiar with the art will immediately recognize that all word processing programs (as well as picture programs, database programs etc.) include quantities of code language (hidden commands) which are unseen when viewing a file formatted to be viewed in the particular program. For example, word processing program files will include code language specifying many variables such as text size, text appearance, margin measurement, kerning, pitch, etc. This hidden code neither appears when the file is viewed, nor when the file is printed. However, the information is acted upon when communicated to a printer.

Those familiar with the art are further aware that different programs will use different codes in order to produce the desired appearance of the written materials contained within the files formatted by those programs. It would be pointless to attempt to list all the possible permutations and forms of code language which would produce the desired result of including code in the browsable file which would instruct a printer to print the written material with a colored background. The reasons for this are simple: code is changed by particular manufacturers whenever so desired. Furthermore different computer programs will use different code language to achieve the same result. Finally, the particular code used is irrelevant for purposes of the instant invention. So long as code language instructing the computer printer upon which the written material embodied in the browsable file is to be printed to print that written material on a colored background with contrasting text, the instant invention will function in the manner intended by the inventor.

It is also known to those familiar with the art that the code language which produces particular results in each program may be obtained directly from the author of the code or the manufacturer of the program. With such information readily available, no undue experimentation whatsoever need be engaged in to practice the herein disclosed invention. In fact, program manufacturers are often very willing to provide code language in the anticipation that use of the program will be increased, thus serving their own business needs.

It will be immediately recognized that in order to best practice the invention as set forth in the second embodiment, it may be necessary to incorporate into the client computer an additional program which, when activated, would make viewing of the browsable file possible. This sort of program is commonly known as a "plug in". Such plug ins are routinely made available by program manufacturers to accomplish any variety of computer tasks. Once installed, the plug in frequently operates from within the browser environment, the plug in becoming activated upon selection by the client from the server of a file written in a format specifically recognized by the plug in.

Operation of the second embodiment of the instant invention may now be easily understood. A client connects to a server for purposes of viewing written materials with an eye toward potential purchase. Upon arriving at the internet location wherein the written material is made available for viewing, the individual using the client is presented with the opportunity to "book browse" any number of browsable files. In the event that a plug in has been incorporated into the instant method, that plug in is activated and renders the browsable file browsable.

When a plug in is not involved, the individual, through the client, instructs the server to provide access to a particular browsable file which is then opened and becomes viewable by the client. The individual may read as much of the browsable file as he or she so chooses, but as has been described above, is discouraged from printing the browsable file because any attempt to so print the browsable file causes the printer to print the written material with a non-white background and contrasting colored text. Because the non-white colored background with contrasting text takes longer to print, and consumes large amounts of printing medium, unauthorized printing of the browsable file is discouraged. The individual, having made a purchase decision, may now use his or her client to transfer a purchase request (make a proper request) to the server and in return (following a payment agreement) have downloaded from the server to the client the salable file.

It should be noted that while the second embodiment uses the example of code language instructing the printer to print a colored background with contrasting colored text, the method could just as easily have had the code language instruct the printer to print the browsable file in a font being sized such that each individual letter of every word found in the written material was printed on a separate sheet of paper. That is, the font size specified by the code could instruct the printer to print each letter in a font size so large that only one letter would fit on each sheet of paper. Obviously, such a font size should exceed 12 point.

Again, as has been indicated throughout this disclosure, while it would be possible for someone to copy the written material made available in the browsable file, the printing of that material would become so burdensome and expensive as to seriously discourage any such unauthorized printing. Again, this is just another example of inventor's method, not an absolute recitation of the only possible means for discouraging unauthorized printing.

Finally, it is believed that in the event that a plug in is chosen as a means for preventing printing of the viewable file, the plug in could be programmed to simply refuse any print command. If the plug in is the only program able to make viewable the browsable file, then it may easily be programmed such that no print command is available, or in the event that a print command is available, the plug in may be programmed so as to recognize code within the browsable file which would reject any print command.

As with the first embodiment, the second embodiment requires that the individual make a purchase decision, and communicate that purchase decision through the client to the server in the form of a proper request to purchase written material. That proper request includes the transfer of data to the server, the data identifying the file containing the written material, and provides a payment (or promise to pay) by the individual for the requested written material. Following the proper request, the written material is transferred from the server to the client via a download of the salable file containing the written material.

In the third embodiment of the instant invention, it is unnecessary to include a colored background which would be visible in the browsable file. Instead, the browsable file would be readable by a program which includes no print-option.

As with the first embodiment, the proper scope of the present invention should be determined only by the broadest interpretation of the appended claims so as encompass all such modifications as well as all relationships equivalent to those described in the specification.

It will be appreciated that the purpose of the foregoing presentation of the second and third embodiments are to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Though no code is provided in either the second or third embodiments, those familiar with the art, as well as those familiar with drafting code language to be used in available programming languages will need no undue experimentation in order to practice the instant invention. Accordingly, the specification and abstract is intended to define neither the invention nor the application, which is measured only by the claims, nor is it intended to be limiting as to the scope of the invention in any way.

Also, the terms "server" and "client" should be given the broadest possible interpretation. While current technology utilizes a server to make files available to multiple clients, it is already known that programming language is available which will have the overall effect of rendering any computer connected to the internet an effective server. In such a case, the computer through which the browsable and/or salable file is available would effectively be the server, while any computer to which these files might be transferred, or from which they might be accessed, could effectively be the client. So long as the browsable file and the salable file are available for downloading or copying from computers, and so long as the browsable file and salable file may be copied onto, or viewed from other computers, the instant invention will function properly.

Further, it will be understood that it is entirely possible for the browsable file and the salable file to be rendered in different formats. There is no requirement, for example, that if the browsable file were formtted in Microsoft .pdf, that the salable file must be also be formatted in the same program. It could just as easily, for example, be formatted in Adobe Acrobat .pdf.

Finally, the general term "internet" should be given its broadest possible interpretation, including so-called internets, intranets and other forms of global computer networks. Obviously, if the invention is practiced such that written material located on any data processing unit (a computer being one such form of data processing unit) may be accessed by another data processing unit, it would fall within the scope of the claims set forth hereinafter.

I claim:

1. A method for providing access to written materials located on a global computer network, yet discouraging unauthorized printing of said materials comprising:
   A. making a server available to a client via the global computer network,
   B. uploading a browsable file to the server,
      I. the browsable file including means for discouraging unauthorized printing of written material embodied in the browsable file,
         a. the means for discouraging nautliorized printin being the written material having background, i. the background having color,
      (i) the background color not being white,
   ii. the background being capable of printing by a printer,
      (i) the printer consuming a printing medium while printing the background,
         1. the printing medium being consumed in such quantities as to render the printing oil the browsable file expensive and thus discouraging printing of the browsable file,
  b. the written material having text,
   i. the text being colored,
      (i) the text color being such as to contrast sufficiently with the background color so as to be legible against the background,
C. making the browsable file available to a client,
   I. the written material embodied in the browsable file thereby being browsable and printable by the client,
D. uploading a salable file to the server,
   I. the salable file being downloadable by the client following a proper request,
   II. the salable file having written material embodied in the salable file,
      a. the written material being the same written material as that located in the browsable file.

2. The method as recited in claim 1 further comprising;
A. the background color being black,
B. the text color being white.

3. The method as recited in claim 1 further comprising;
A. the background color being black,
B. the text color being gray.

* * * * *

UNITED STATES PATENT AND TRADEMARK OFFICE
CERTIFICATE OF CORRECTION

PATENT NO.       : 6,807,560 B1
APPLICATION NO. : 09/684272
DATED            : October 19, 2004
INVENTOR(S)      : Lance E. Zuesse Page 1 of 1

It is certified that error appears in the above-identified patent and that said Letters Patent is hereby corrected as shown below:

Column 10
Line 66 please replace "discouraging nautliorized printin" with --discouraging unauthorized printing--.

Column 11
Line 8 please replace "the printing oil the" with -- the printing of the--.
Line 7 please replace "1" with --(ii)--.

Column 12
Line 11-12 please delete these lines and replace with --the background color being black and the text color being white.--
Line 15-16 please delete these lines and replace with --the background color being black and the text color being white.--

Signed and Sealed this

Nineteenth Day of June, 2007

JON W. DUDAS
*Director of the United States Patent and Trademark Office*